United States Patent
Lin et al.

(10) Patent No.: US 11,977,367 B2
(45) Date of Patent: May 7, 2024

(54) COMMAND SCRIPT EDITING METHOD, COMMAND SCRIPT EDITOR AND GRAPHIC USER INTERFACE

(71) Applicant: UNITED MICROELECTRONICS CORP., Hsinchu (TW)

(72) Inventors: Yu-Chi Lin, Taichung (TW); Li-Hsin Yang, Tainan (TW); Yu-Shan Hsu, Tainan (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 234 days.

(21) Appl. No.: 17/318,199

(22) Filed: May 12, 2021

(65) Prior Publication Data

US 2022/0365517 A1 Nov. 17, 2022

(51) Int. Cl.
| | | |
|---|---|---|
| *G05B 19/418* | (2006.01) | |
| *G06F 3/048* | (2013.01) | |
| *G06F 3/04842* | (2022.01) | |
| *G06F 8/33* | (2018.01) | |
| *G06F 8/34* | (2018.01) | |
| *G06F 8/40* | (2018.01) | |

(52) U.S. Cl.
CPC . *G05B 19/41835* (2013.01); *G05B 19/41865* (2013.01); *G06F 3/048* (2013.01); *G06F 3/04842* (2013.01); *G06F 8/33* (2013.01); *G06F 8/34* (2013.01); *G06F 8/40* (2013.01); *G05B 2219/2206* (2013.01); *G05B 2219/23121* (2013.01); *G05B 2219/23135* (2013.01); *G05B 2219/23158* (2013.01)

(58) Field of Classification Search
CPC ........ G05B 19/41835; G05B 19/41865; G05B 2219/2206; G05B 2219/23121; G05B 2219/23135; G05B 2219/23158; G06F 3/048; G06F 3/04842; G06F 88/33; G06F 8/34; G06F 8/40
See application file for complete search history.

(56) References Cited

U.S. PATENT DOCUMENTS

| | | |
|---|---|---|
| 5,278,918 A | 1/1994 | Bernzott et al. |
| 7,860,266 B2 | 12/2010 | Sekiguchi et al. |
| 2009/0273597 A1 | 11/2009 | Chatamballi et al. |
| 2014/0325434 A1* | 10/2014 | Chang ................. G06F 3/04886 715/790 |
| 2015/0350031 A1* | 12/2015 | Burks ................... H04W 76/16 715/736 |

(Continued)

OTHER PUBLICATIONS

NPL1 (Altium, "Working with Panels in Altium Designer", Nov. 14, 2019) (Year: 2019).*
Altium, "PCB Editor View Modes", Aug. 16, 2017 (Year: 2017).*

*Primary Examiner* — Chat C Do
*Assistant Examiner* — Noor Alkhateeb
(74) *Attorney, Agent, or Firm* — WPAT, P.C

(57) ABSTRACT

A command script editing method, a command script editor and a graphic user interface are provided. The command script editing method includes the following steps. The command node is edited according to at least one inputting action or at least one image identifying action performed on the operation frame when the command script editor is at an image editing mode. The command node is edited according to a setting content of at least one process action when the command script editor is at a process editing mode.

20 Claims, 11 Drawing Sheets

(56) References Cited

U.S. PATENT DOCUMENTS

| | | | |
|---|---|---|---|
| 2016/0240003 A1* | 8/2016 | Frayne | B29C 64/393 |
| 2016/0274553 A1* | 9/2016 | Strohmenger | G05B 17/02 |
| 2017/0039041 A1* | 2/2017 | Bommireddi | G06F 8/33 |
| 2017/0060541 A1* | 3/2017 | Saleh | G06F 8/34 |
| 2017/0187658 A1* | 6/2017 | Ryu | G06F 16/583 |
| 2018/0173401 A1* | 6/2018 | Kim | G06F 3/014 |
| 2019/0042574 A1* | 2/2019 | Kim | G06F 18/41 |
| 2019/0070508 A1* | 3/2019 | Cotton | A63F 13/812 |
| 2019/0129769 A1* | 5/2019 | Frech | G06F 8/34 |
| 2019/0205652 A1* | 7/2019 | Ray | G06V 20/47 |
| 2021/0149644 A1* | 5/2021 | Kawanaka | G06F 8/313 |
| 2021/0334076 A1* | 10/2021 | Abe | G06F 9/4451 |
| 2022/0066905 A1* | 3/2022 | Lee | G06F 11/302 |

* cited by examiner

//COMMAND SCRIPT EDITING METHOD, COMMAND SCRIPT EDITOR AND GRAPHIC USER INTERFACE

TECHNICAL FIELD

The disclosure relates in general to a command script editing method, a command script editor and a graphic user interface, and more particularly to a command script editing method, a command script editor and a graphic user interface of a robotic process automation (RPA) device.

BACKGROUND

With the rapid development of semiconductor technology, the complexity of the semiconductor process is gradually increasing. In the semiconductor manufacturing process, a considerable number of semiconductor manufacturing apparatus need to be operated. The operation of the semiconductor manufacturing apparatus is labor intensive and easy to make mistakes.

For automatically operating the semiconductor manufacturing apparatus, the robotic process automation (RPA) technology is invented. Through the RPA technology, a command script can be edited in advance and the semiconductor manufacturing apparatus can be automatically operated according the command script without human power.

In traditional, the command script is edited by many typing or complex instructions inputting. Semiconductor products are quite diverse, and so many command scripts need to be edited. Therefore, researchers are working hard to develop a command script editor to make it easier for the user to edit the command scripts.

SUMMARY

The disclosure is directed to a command script editing method, a command script editor and a graphic user interface. The command script editor helps the user to create or edit a command script without many typing or complex instructions inputting.

According to one embodiment, a command script editing method of a robotic process automation (RPA) device for a semiconductor manufacturing apparatus is provided. The command script editing method includes the following steps. Whether a command script editor is at an image editing mode or at a process editing mode is determined. An operation frame of the semiconductor manufacturing apparatus is shown in a main window of the command script editor and a command flowchart is shown in a secondary window of the command script editor, if the command script editor is at the image editing mode. The command flowchart includes at least one command node. The command node is edited according to at least one inputting action or at least one image identifying action performed on the operation frame when the command script editor is at the image editing mode. The command flowchart is shown in the main window of the command script editor and the operation frame of the semiconductor manufacturing apparatus is shown in the secondary window of the command script editor, if the command script editor is at the process editing mode. The command node is edited according to a setting content of at least one process action when the command script editor is at the process editing mode.

According to an alternative embodiment, a command script editor of a robotic process automation (RPA) device for a semiconductor manufacturing apparatus. The command script editor includes a switching unit, a display unit, a first editing unit, a second editing unit and a third editing unit. The switching unit is configured to switch the command script editor being at an image editing mode or at a process editing mode. The display unit is configured to display a main window and a secondary window. The main window shows an operation frame of the semiconductor manufacturing apparatus if the command script editor is at the image editing mode and shows a command flowchart including at least one command node if the command script editor is at the process editing mode. The secondary window shows the command flowchart if the command script editor is at the image editing mode and shows the operation frame of the semiconductor manufacturing apparatus if the command script editor is at the process editing mode. The first editing unit is configured to edit the command node according to at least one inputting action performed on the operation frame when the command script editor is at the image editing mode. The second editing unit is configured to edit the command node according to at least one image identifying action performed on the operation frame when the command script editor is at the image editing mode. The third editing unit is configured to edit the command node according to a setting content of at least one process action when the command script editor is at the process editing mode.

According to another embodiment, a graphic user interface of a command script editor. The graphic user interface includes a switch button, a main window and a secondary window. The switch button is configured to switch the command script editor being at an image editing mode or at a process editing mode. The main window shows an operation frame of a semiconductor manufacturing apparatus if the command script editor is at the image editing mode, and shows a command flowchart if the command script editor is at the image editing mode. The secondary window shows the command flowchart if the command script editor is at the image editing mode, and shows the operation frame of the semiconductor manufacturing apparatus if the command script editor is at the image editing mode.

Figure 1:
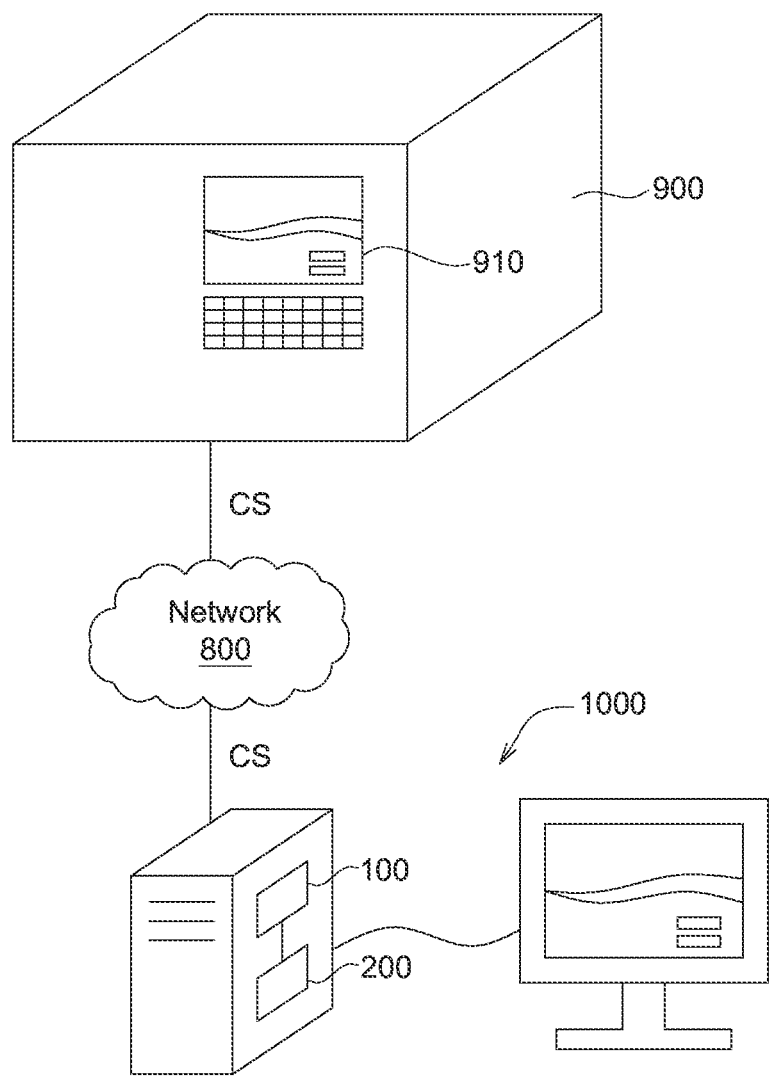
FIG. 1 shows a robotic process automation (RPA) device.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, which shows a robotic process automation (RPA) device 1000. The RPA device 1000 is, for example, a server, a cluster computing system, or a computer. The RPA device 1000 is connected to at least one semiconductor manufacturing apparatus 900 via the network 800. The semiconductor manufacturing apparatus 900 is, for example, a diffusion apparatus, an etching apparatus, or an annealing apparatus. The semiconductor manufacturing apparatus 900 is remotely controlled by the RPA device 1000 according to a command script CS. The semiconductor manufacturing apparatus 900 can be automatically operated according to the command script CS. For example, the semiconductor manufacturing apparatus 900 may be automatically operated the following procedures according to the command script CS. A control system of the semiconductor manufacturing apparatus 900 can be automatically logged in without manually inputting any information on an operation frame 910. The parameters can be automatically set without any operation on the operation frame 910. The color of the gas in the chamber can be automatically detected without the need for human eyes to observe. The processing result can be automatically transmitted without any operation on the operation frame 910. By analogy, various operations on the semiconductor manufacturing apparatus 900 can be automatically executed according to the command script CS.

In the present embodiment, the RPA device 1000 includes a command script execution engine 100 and a command script editor 200. The command script execution engine 100 and the command script editor 200 can be integrated into one device. Or, the command script execution engine 100 and the command script editor 200 can be disposed in separate devices. The command script execution engine 100 is configured to execute commands according to the command script CS. The command script editor 200 is configured to edit the command script CS.

In the present embodiment, the command script editor 200 helps the user to create or edit the command script CS without many typing or complex instructions inputting. The commands for the semiconductor manufacturing apparatus 900 include text inputting, button clicking, screenshot, text collecting, text matching, number comparing, specific text detecting, specific pattern detecting, specific color detecting, color collecting, report sending, mail sending, message sending or counter creating. Referring to Table I, the text inputting, the button clicking and the screenshot are inputting actions performed on the operation frame 910; the text collecting, the text matching, the number comparing, the specific text detecting, the specific pattern detecting, the specific color detecting and the color collecting are image identifying actions performed on the operation frame 910; the report sending, the mail sending, the message sending and the counter creating are process actions which are not related to the operation frame 910.

TABLE 1

| Commands | Classify | Is it related to the operation frame 910? |
|---|---|---|
| text inputting | inputting action | Yes |
| button clicking | | |
| Screenshot | | |
| text collecting | image identifying action | |
| text matching | | |
| number comparing | | |
| specific text detecting | | |
| specific pattern detecting | | |
| specific color detecting | | |
| color collecting | | |
| report sending | process | No |

TABLE 1-continued

| Commands | Classify | Is it related to the operation frame 910? |
|---|---|---|
| mail sending | action | |
| message sending | | |
| counter creating | | |

Figure 2:
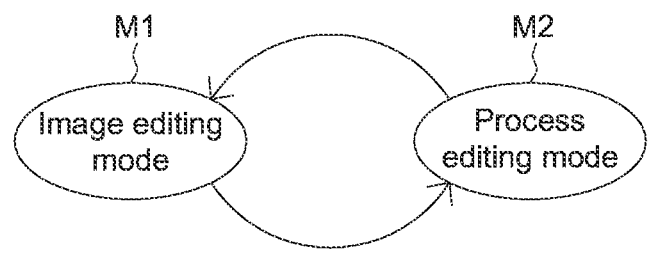
FIG. 2 shows an image editing mode and a process editing mode of a command script editor.

Please refer to FIG. 2, which shows an image editing mode M1 and a process editing mode M2 of the command script editor 200. The command script editor 200 has the image editing mode M1 and the process editing mode M2. The image editing mode M1 is used for editing the inputting actions and the image identifying actions which are performed on the operation frame 910. The process editing mode M2 is used for editing the process actions which are not related to the operation frame 910. The command script editor 200 can be switched between the image editing mode M1 and the process editing mode M2.

Figure 3A:
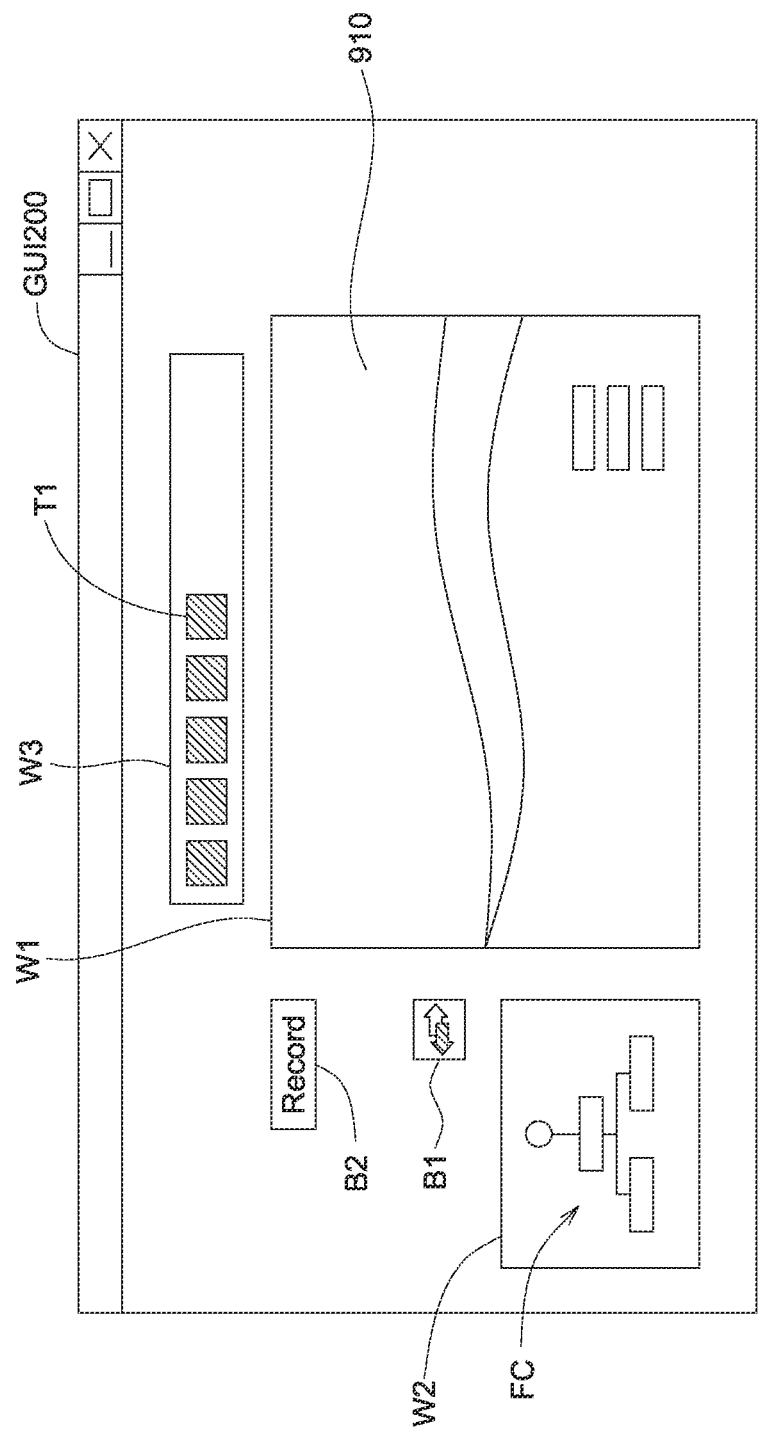
FIG. 3A shows a graphic user interface of the command script editor being at the image editing mode.
Figure 3B:
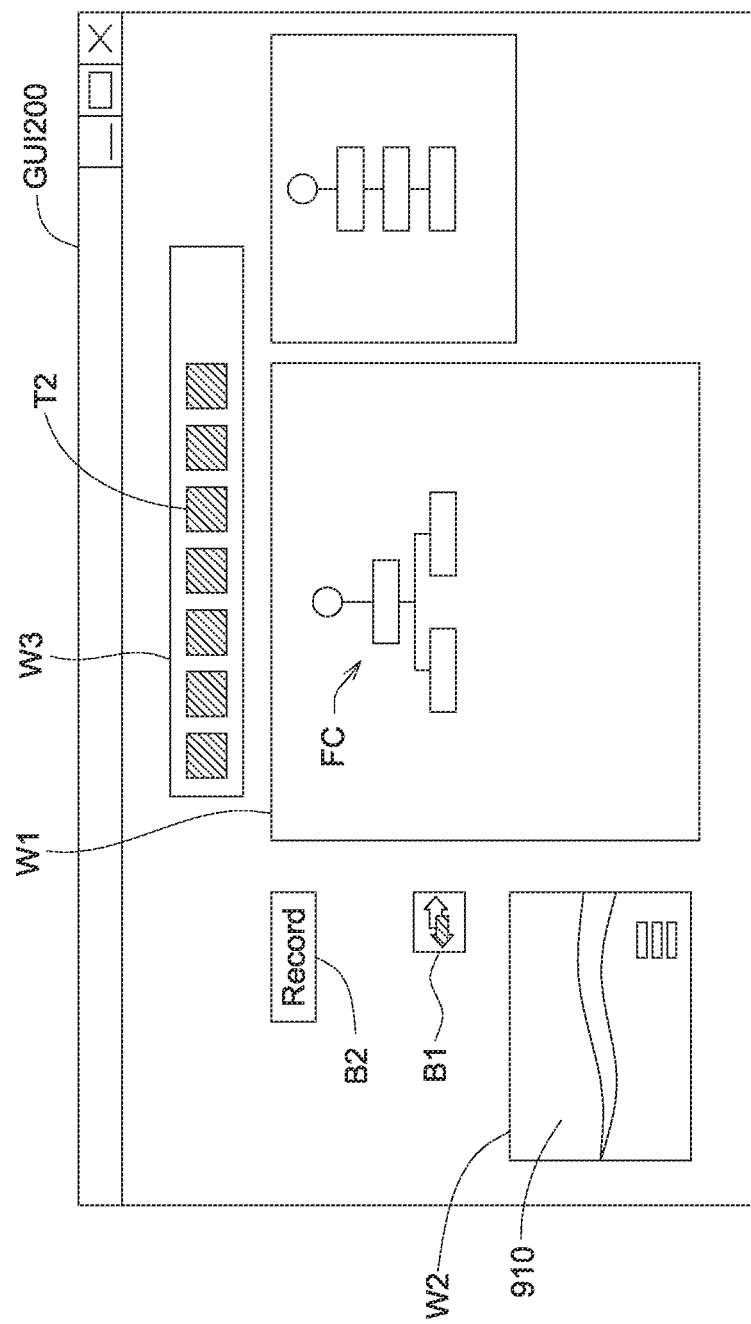
FIG. 3B shows the graphic user interface of the command script editor being at the process editing mode.

Please refer to FIGS. 3A and 3B. FIG. 3A shows a graphic user interface GUI 200 of the command script editor 200 being at the image editing mode M1, and FIG. 3B shows the graphic user interface GUI 200 of the command script editor 200 being at the process editing mode M2. The graphic user interface GUI 200 at least includes a switch button B1, a record button B2, a main window W1, a secondary window W2 and a tool window W3. The main window W1 is larger than the secondary window W2. The switch button B1 is used to switch the command script editor 200 being at the image editing mode M1 or at the process editing mode M2.

As shown in FIG. 3A, when the command script editor 200 is at the main editing mode M1, the main window W1 shows the operation frame 910 of the semiconductor manufacturing apparatus 900, the secondary window W2 shows a command flowchart FC, and the tool window W3 shows a plurality of image tools T1 each of which is used to perform the image identifying action on the operation frame 910 of the semiconductor manufacturing apparatus 900.

As shown in FIG. 3B, when the command script editor 200 is at the process editing mode M2, the main window W1 shows the command flowchart FC, the secondary window W2 shows the operation frame 910 of the semiconductor manufacturing apparatus 900, and the tool window W3 shows a plurality of process tools T2 each of which is used to perform the process action.

Figure 4:
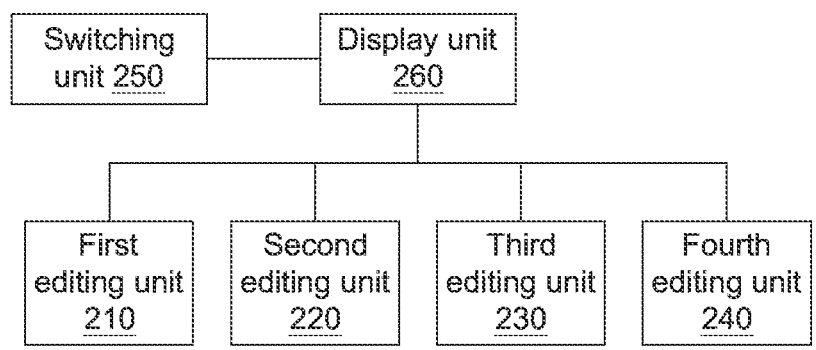
FIG. 4 shows a block diagram of the command script editor.

Please refer to FIG. 4, which shows a block diagram of the command script editor 200. The command script editor 200 includes a switching unit 250, a display unit 260, a first editing unit 210, a second editing unit 220, a third editing unit 230 and a fourth editing unit 240. The display unit 260 is, for example, a display panel or a touch display. The switching unit 250, the first editing unit 210, the second editing unit 220, the third editing unit 230 and/or the fourth editing unit 240 are/is, for example, a circuit, a chip, a program code, or a storage device storing the program code. The command script editor 200 helps the user to create or edit the commands, such that the command script CS can be created or edited without many typing or complex instructions inputting. The operation of the command script editor 200 and the graphic user interface GUI 200 are illustrated with a flowchart.

Figure 5:
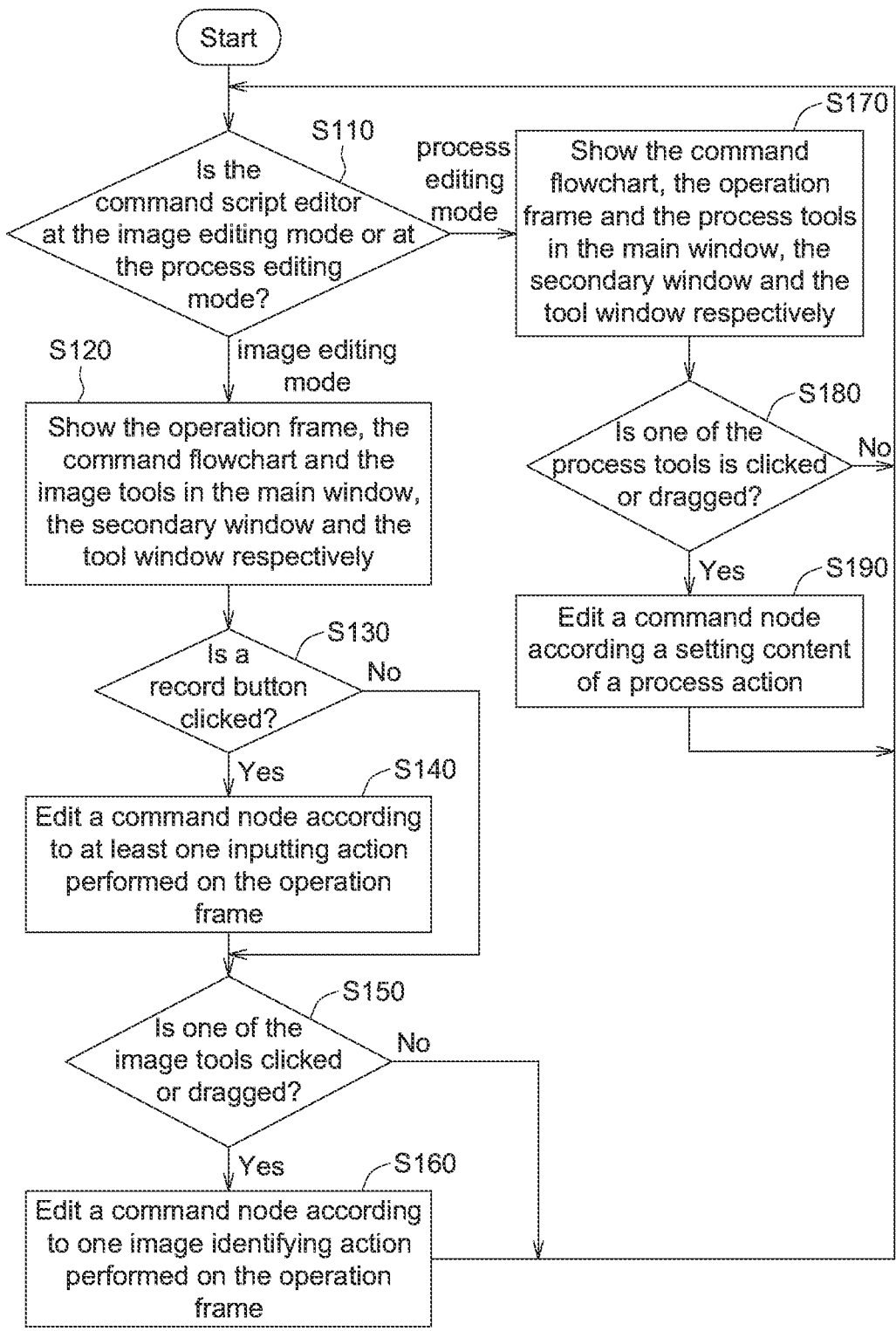
FIG. 5 shows a flowchart of a command script editing method of the RPA device.

Please refer to FIG. FIGS. 5 to 9. FIG. 5 shows a flowchart of a command script editing method of the RPA device 1000. FIGS. 6 to 9 illustrate the steps in FIG. 5. In step S110, whether the command script editor 200 is at the image editing mode M1 or at the process editing mode M1 is determined. After clicking the switch button B1, the switching unit 250 switches the command script editor 200 being at the image editing mode M1 or the process editing mode M2. If the command script editor 200 is at the image editing mode M1, the process proceeds to steps S120 to S160; if the command script editor 200 is at the process editing mode M2, the process proceeds to steps S170 to S190.

In step S120, referring to FIG. 3A, the switching unit 250 controls the display unit 260 to show the operation frame 910, the command flowchart FC and the image tools T1 in the main window W1, the secondary window W2 and the tool window W3 respectively.

Next, in step S130, whether the record button B2 is clicked is determined. If the record button B2 is clicked, the process proceeds to step S140.

Figure 6:
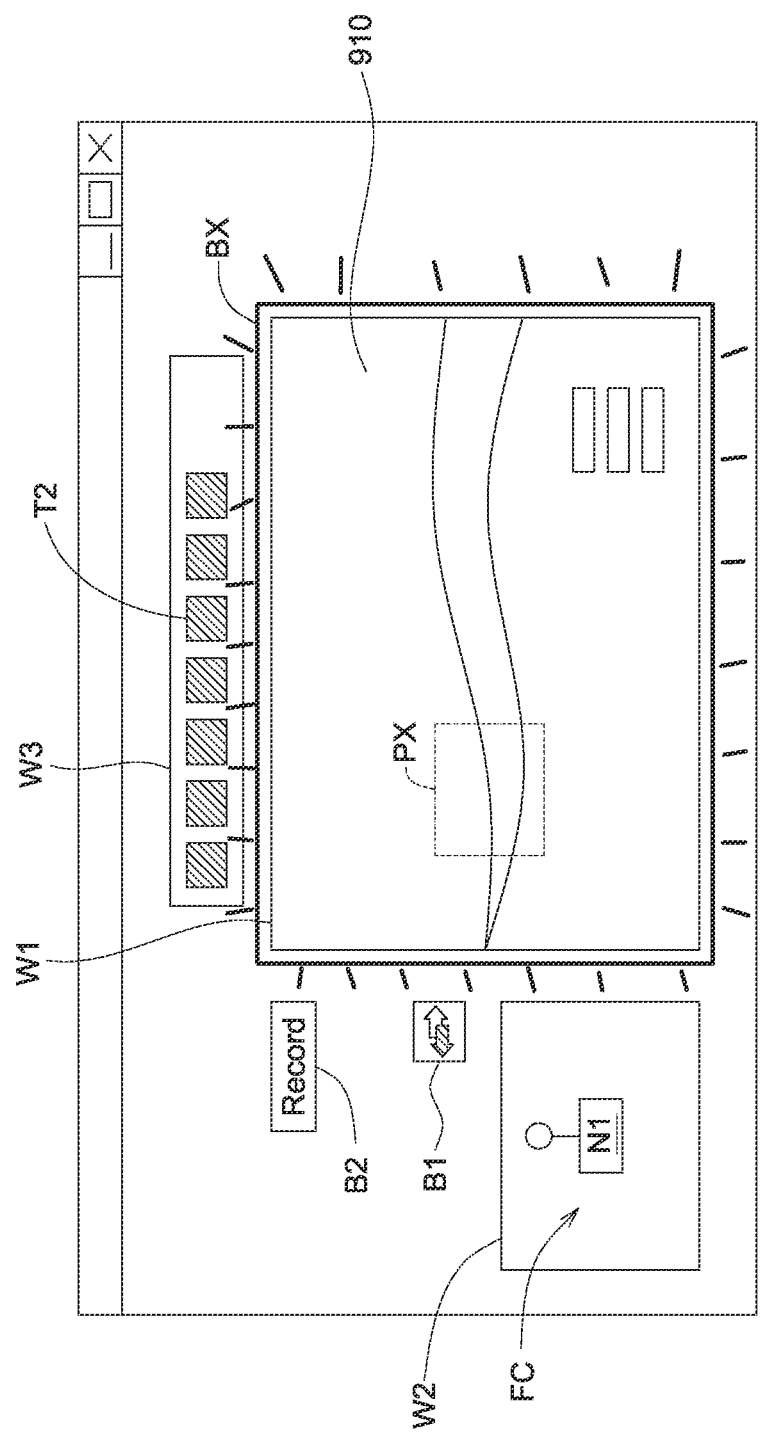
FIGS. 6 to 9 illustrate the steps in FIG. 5.

In step S140, referring to FIG. 6, a command node N1 is edited according to at least one inputting action performed on the operation frame 910. In this step, the inputting action(s) performed on the operation frame 910 is/are recorded. The inputting action is, for example, text inputting, button clicking or screenshot. For example, the user may input username/password and then click "OK" to log in the system. The series of inputting actions are recorded to be the command node N1. When the inputting action(s) performed on the operation frame is/are being recorded, a flashing box BX is shown around the main window W1.

Further, in step S140, a positioning box PX is used for aligning a position of the inputting action performed on the operation frame 910. For example, the pattern in the positioning box PX and the position of the inputting action relative to the positioning box PX are recorded. When the command node N1 is executed to perform the recorded inputting actions, the positioning box PX is found out from the operation frame 910, and the position of the recorded inputting actions are aligned according to the positioning box PX. Therefore, the recorded inputting actions can be accurately performed even if the operation frame 910 of one semiconductor manufacturing apparatus 900 is shifted.

Next, in step S150, whether one of the image tools T1 is clicked or dragged is determined. If one of the image tools T1 is clicked or dragged, the process proceeds to step S160.

Figure 7:
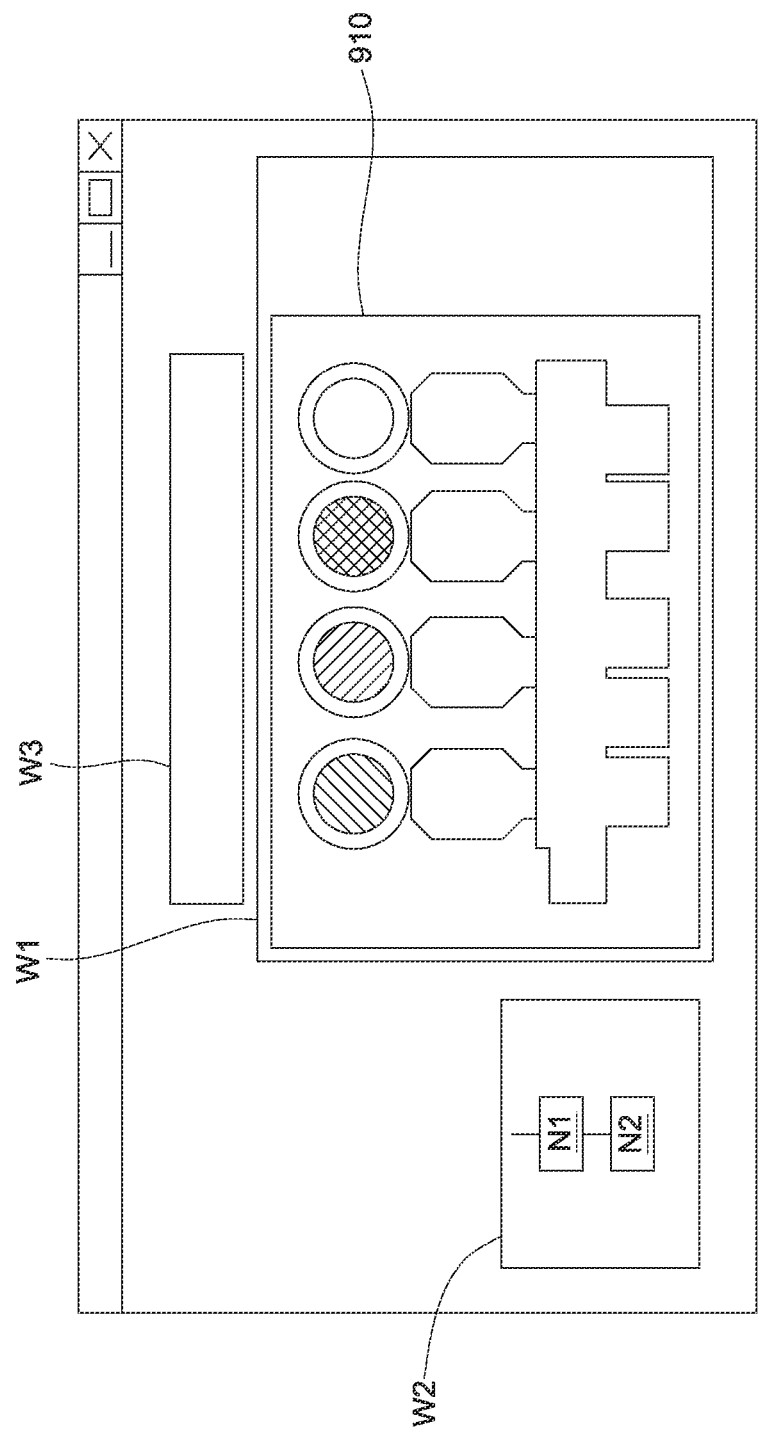
Figure 8:
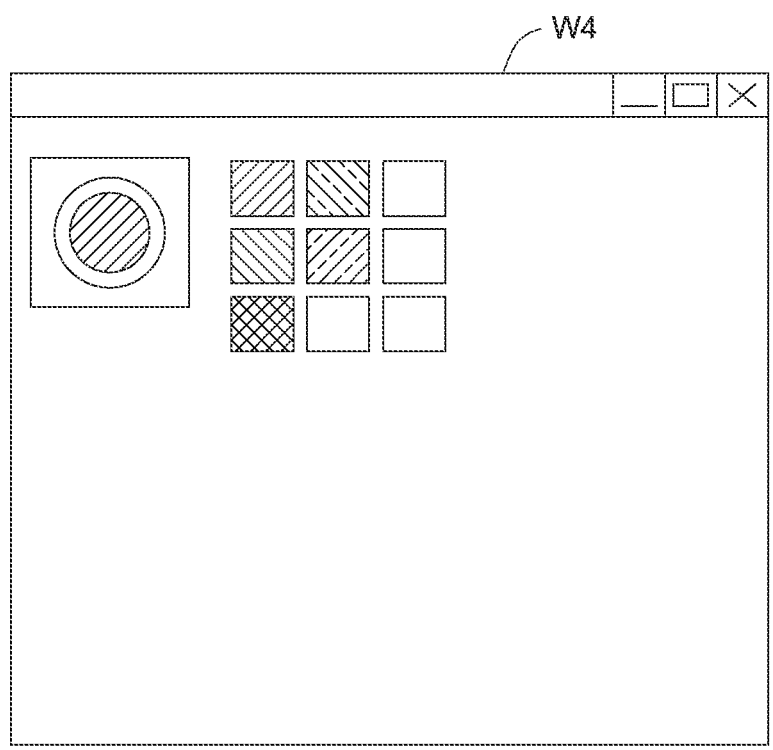

In step S160, referring to FIG. 7, a command node N2 is edited according to one image identifying action performed on the operation frame 910. For example, as shown in FIG. 7, a specific color detecting is performed on the operation frame 910. In this step, referring to FIG. 8, a parameter setting window W4 can be used to set the parameter of the image identifying action. For example, as shown in FIG. 8, the specific color to be detected can be set in the parameter setting window W4.

By performing the steps S120 to S160, the inputting actions and the image identifying actions which are performed on the operation frame 910 can be edited during the image editing mode M1.

On the other hand, if the command script editor 200 is at the process editing mode M2, the process proceeds to steps S170 to S190.

In step S170, referring to FIG. 3B, the switching unit 250 controls the display unit 260 to show the command flowchart FC, the operation frame 910 and the process tools T2 in the main window W1, the secondary window W2 and the tool window W3 respectively.

Next, in step S180, whether one of the process tools T2 is clicked or dragged is determined. If the process tool T2 is clicked or dragged, the process proceeds to step S190.

Figure 9:
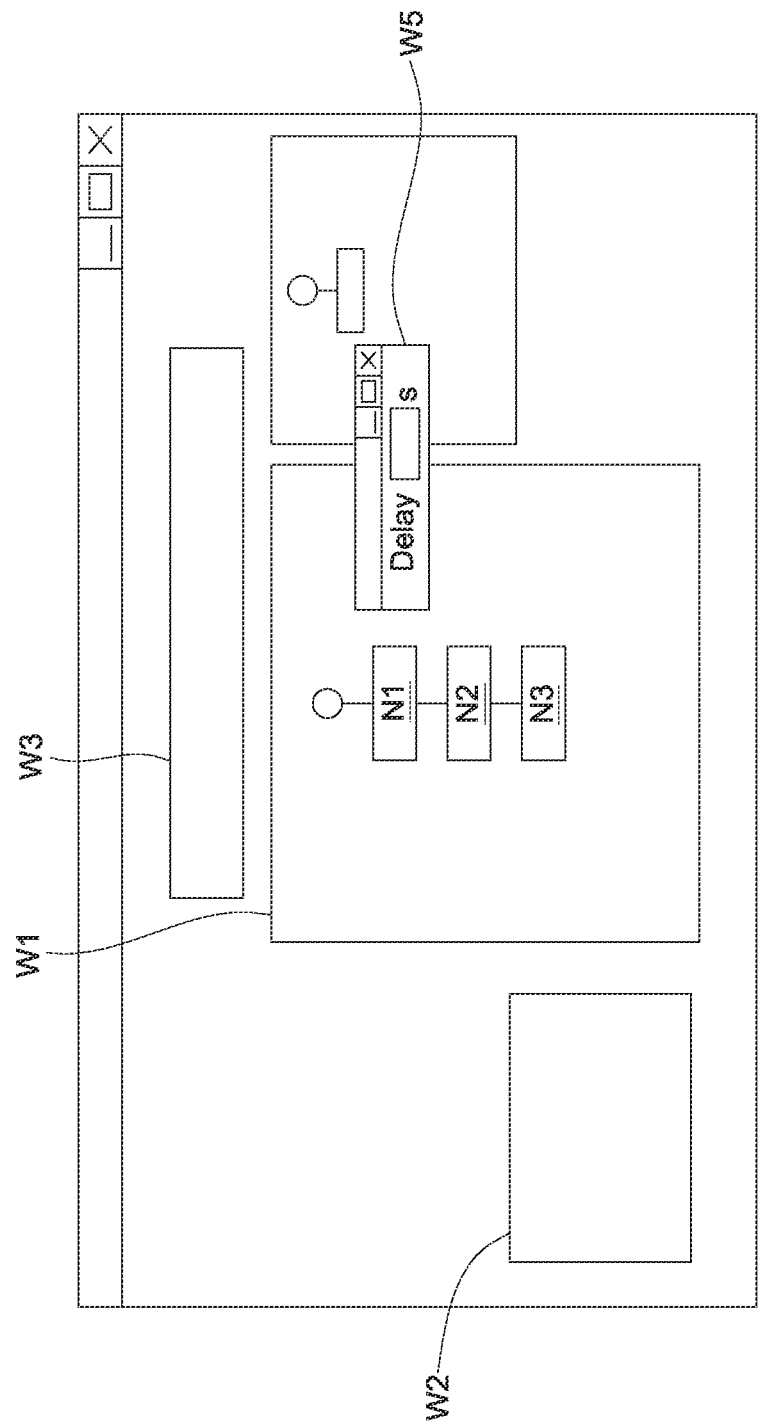

In step S190, referring to FIG. 9, a command node N3 is edited according a setting content of a process action. For example, as shown in FIG. 9, a delay time is set in a parameter setting window W5.

By performing the steps S170 to S190, the process actions which are not related to the operation frame 910 can be edited during the process editing mode M2.

After performing the step S160 or the step S190, the process returns to step S110. That is to say, the command script editor 200 can be switched at the image editing mode M1 or at the process editing mode M2 when the user clicks the switch button B1 at any time.

Figure 10:
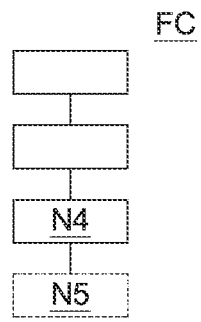
FIGS. 10 to 15 show the command flowchart according to several embodiments.
Figure 11:
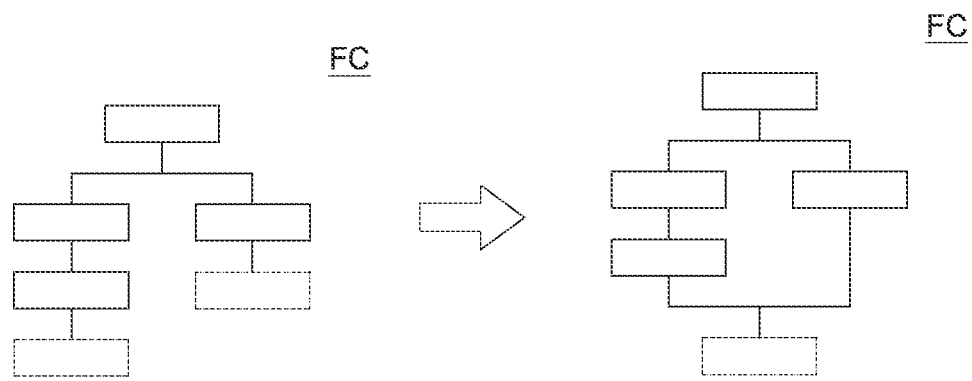
Figure 12:
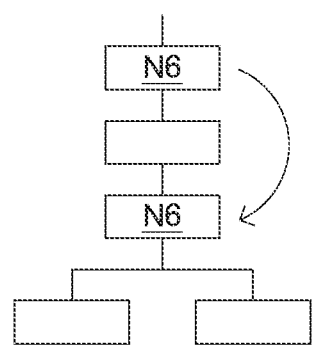
Figure 13:
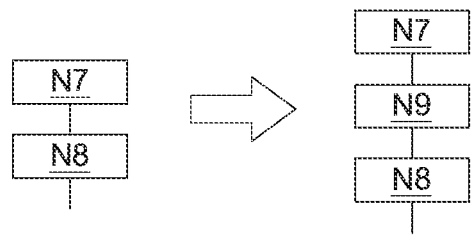
Figure 14:
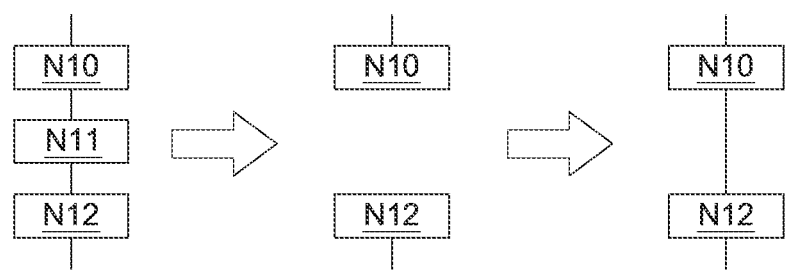

Please refer to FIGS. 10 to 15, which show the command flowchart FC according to several embodiments. As shown in FIG. 10, when a command node N4 is completely edited, a new commend node N5 will be automatically created. As shown in FIG. 11, two branches can be combined. As shown in FIG. 12, a command node N6 can be copied (or cut) and pasted to another location. As shown in FIG. 13, a command node N9 can be inserted between a command node N7 and a command node N8. As shown in FIG. 14, a command node N11 can be deleted, and then a command node N10 and a command node N12 can be reconnected.

Figure 15:
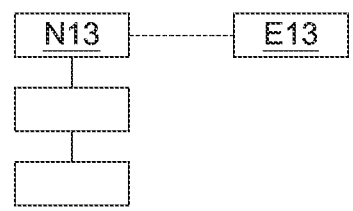

As shown in FIG. 15, a command node N13 can be added an exception handling procedure E13. The exception handling procedure E13 is used for handling an exception. For example, when a KVM device is broken, a warning signal may be immediately sent to the engineer for handing the semiconductor manufacturing apparatus 900.

Base on above, the command script editor helps the user to create or edit the command script without many typing or complex instructions inputting. Even if semiconductor products are quite diverse, editing the command scripts becomes easier via the command script editor.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A command script editing method of a robotic process automation (RPA) device for a semiconductor manufacturing apparatus, comprising:
    switching, by the RPA device, a command script editor being at an image editing mode or at a process editing mode;
    displaying, by a display of the RPA device, an operation frame of the semiconductor manufacturing apparatus in a main window of the command script editor and displaying, by the display of the RPA device, a command flowchart in a secondary window of the command script editor, if the command script editor is at the image editing mode, wherein the command flowchart includes at least one command node;
    recording, by the RPA device, the at least one command node according to at least one inputting action or at least one image identifying action performed on the operation frame when the command script editor is at the image editing mode;
    displaying, by the display of the RPA device, the command flowchart in the main window of the command script editor and displaying, by the display of the RPA device, the operation frame of the semiconductor manufacturing apparatus in the secondary window of the command script editor, if the command script editor is at the process editing mode, wherein when the command script editor is switched from the image editing mode to the process editing mode, the operation frame in the main window is replaced by the command flowchart, the command flowchart in the secondary window is replaced by the operation frame, a size of the operation frame and a size of the command flowchart are swapped, one of the size of the operation frame and the size of the command flowchart is enlarged, another one of the size of the operation frame and the size of the command flowchart is shrunk, the operation frame and the command flowchart are not overlapped, and locations of the operation frame and the command flowchart are exchanged; and editing, by the RPA device, the at least one command node according to a setting content of at least one process action when the command script editor is at the process editing mode;

wherein the image identifying action comprises text collecting, text matching, number comparing, specific text detecting, specific color detecting, and color collecting.

2. The command script editing method according to claim 1, wherein the recording the at least one command node according to the inputting action or the image identifying action performed on the operation frame, the inputting action performed on the operation frame is recorded.

3. The command script editing method according to claim 2, wherein when the inputting action performed on the operation frame is being recorded, a flashing box is shown around the main window.

4. The command script editing method according to claim 2, wherein when the inputting action performed on the operation frame is being recorded, a positioning box is used for aligning a position of the inputting action performed on the operation frame.

5. The command script editing method according to claim 1, wherein the inputting action is text inputting, button clicking or screenshot.

6. The command script editing method according to claim 1, further comprising: showing a plurality of image tools in a tool window, if the command script editor is at the image editing mode, wherein each one of the plurality of image tools is used to perform the image identifying action on the operation frame of the semiconductor manufacturing apparatus.

7. The command script editing method according to claim 1, wherein the image identifying action further comprises specific pattern detecting.

8. The command script editing method according to claim 1, further comprising: showing a plurality of process tools in a tool window, if the command script editor is at the process editing mode, wherein each one of the plurality of process tools is used to perform the at least one process action.

9. The command script editing method according to claim 1, wherein the at least one process action is report sending, mail sending, message sending or counter creating.

10. The command script editing method according to claim 1, further comprising: adding an exception handling procedure in the at least one command node, wherein the exception handling procedure is used for handling an exception.

11. A command script editor of a robotic process automation (RPA) device for a semiconductor manufacturing apparatus, comprising:

a switching unit, configured to switch the command script editor being at an image editing mode or a process editing mode;

a display, configured to display a main window and a secondary window, wherein the main window shows an operation frame of the semiconductor manufacturing apparatus if the command script editor is at the image editing mode and shows a command flowchart including at least one command node if the command script editor is at the process editing mode the secondary window shows the command flowchart if the command script editor is at the image editing mode and shows the operation frame of the semiconductor manufacturing apparatus if the command script editor is at the process editing mode when the command script editor is switched from the image editing mode to the process editing mode, the operation frame in the main window is replaced by the command flowchart, and the command flowchart in the secondary window is replaced by the operation frame, a size of the operation frame and a size of the command flowchart are swapped, one of the size of the operation frame and the size of the command flowchart is enlarged, another one of the size of the operation frame and the size of the command flowchart is shrunk, the operation frame and the command flowchart are not overlapped, and locations of the operation frame and the command flowchart are exchanged;

a first editing unit, configured to record the command node according to at least one inputting action performed on the operation frame when the command script editor is at the image editing mode;

a second editing unit, configured to record the command node according to at least one image identifying action performed on the operation frame when the command script editor is at the image editing mode; and a third editing unit, configured to edit the command node according to a setting content of at least one process action when the command script editor is at the process editing mode;

wherein the image identifying action comprises text collecting, text matching, number comparing, specific text detecting, specific color detecting, and color collecting.

12. The command script editor according to claim 11, wherein the first editing unit records the inputting action performed on the operation frame.

13. The command script editor according to claim 12, wherein the first editor unit shows a flashing box around the main window when the inputting action performed on the operation frame is being recorded.

14. The command script editor according to claim 12, wherein the first editor unit uses a positioning box for aligning a position of the inputting action performed on the operation frame when the inputting action performed on the operation frame is being recorded.

15. The command script editor according to claim 11, wherein the inputting action is text inputting, button clicking or screenshot.

16. The command script editor according to claim 11, wherein the display is further configured to display a tool window, the tool window shows a plurality of image tools if the command script editor is at the image editing mode, and each one of the plurality of image tools is used to perform the image identifying action on the operation frame of the semiconductor manufacturing apparatus.

17. The command script editor according to claim 11, wherein the image identifying action further comprises specific pattern detecting.

18. The command script editor according to claim 11, wherein the display is further configured to display a tool window, the tool window shows a plurality of process tools if the command script editor is at the process editing mode, and each one of the plurality of process tools is used to perform the at least one process action.

19. The command script editor according to claim 11, wherein the at least one process action is report sending, mail sending, message sending or counter creating.

20. The command script editor according to claim 11, further comprising: a fourth editing unit, configured to add an exception handling procedure in the command node, wherein the exception handling procedure is used for handling an exception.

* * * * *